Feb. 21, 1956    J. MIHALYI    2,735,332
MOTION-PICTURE CAMERA
Filed June 21, 1954    8 Sheets-Sheet 1

Joseph Mihalyi
INVENTOR.

BY Daniel I. Mayne
Karl T. Staramore
ATTORNEYS

Feb. 21, 1956 — J. MIHALYI — 2,735,332
MOTION-PICTURE CAMERA
Filed June 21, 1954 — 8 Sheets-Sheet 2

Joseph Mihalyi
INVENTOR.
BY
ATTORNEYS

Feb. 21, 1956  J. MIHALYI  2,735,332
MOTION-PICTURE CAMERA
Filed June 21, 1954  8 Sheets-Sheet 3
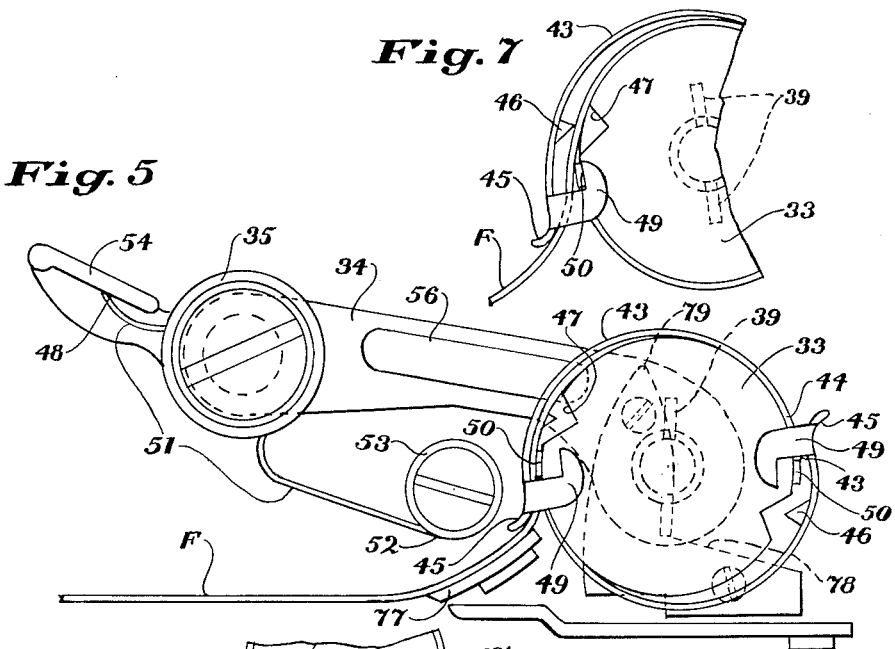
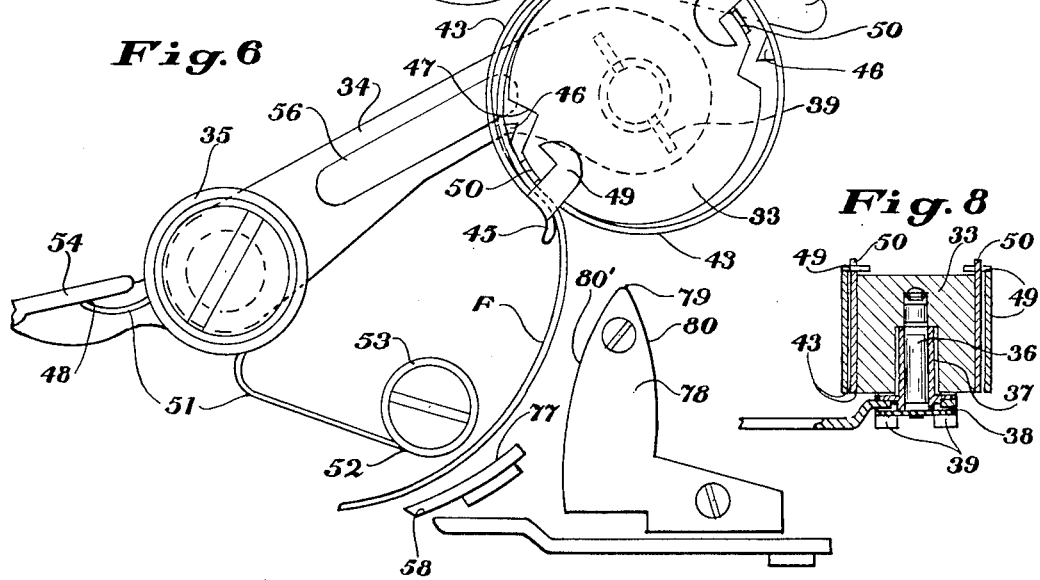
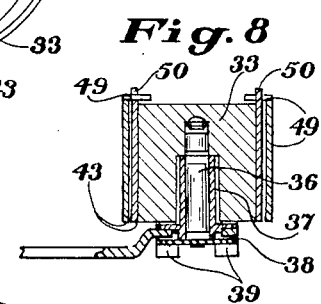
Joseph Mihalyi
INVENTOR.
BY
ATTORNEYS

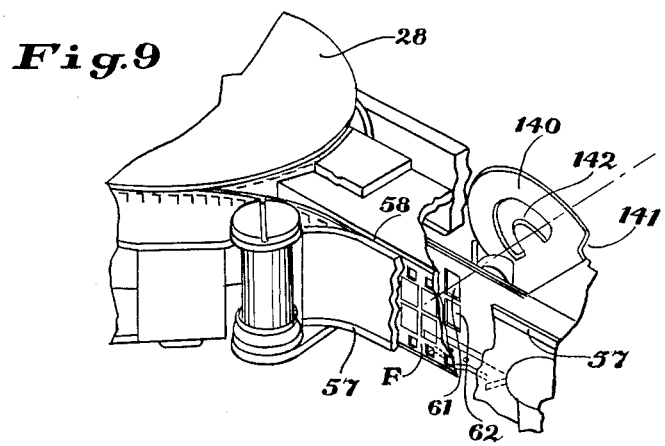
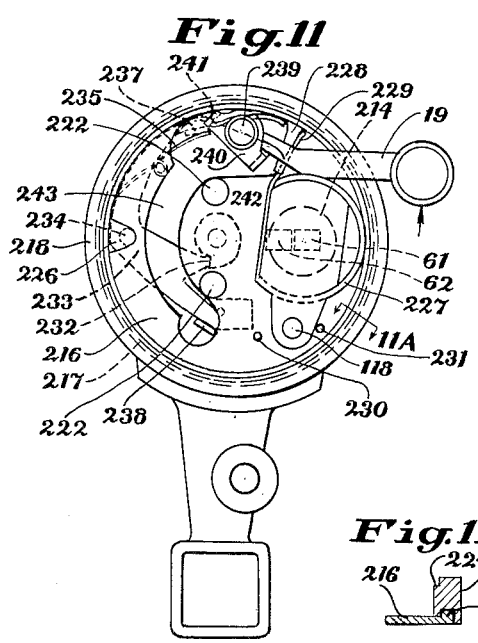
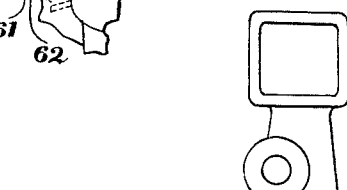
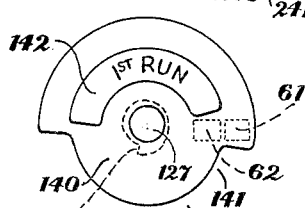

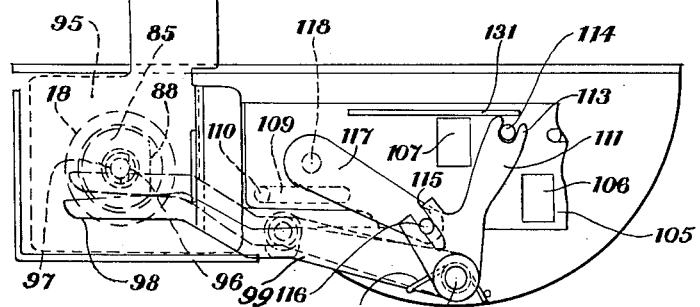
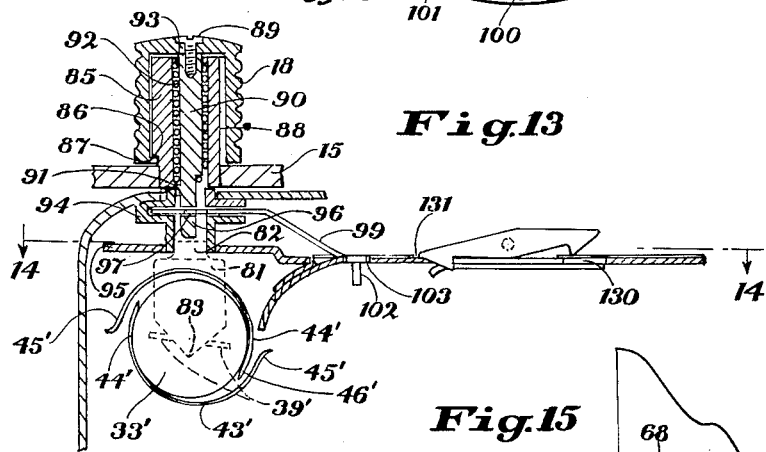
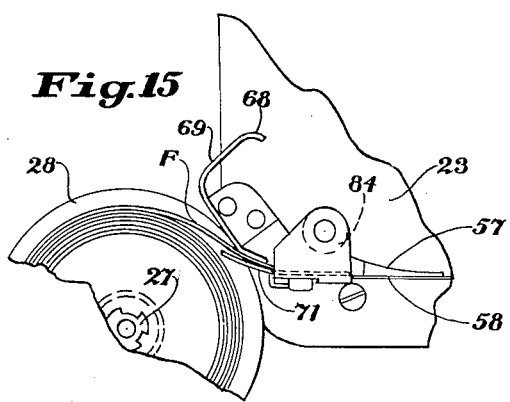
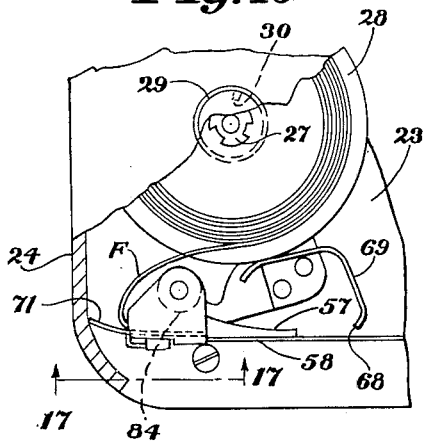
Joseph Mihalyi
INVENTOR.

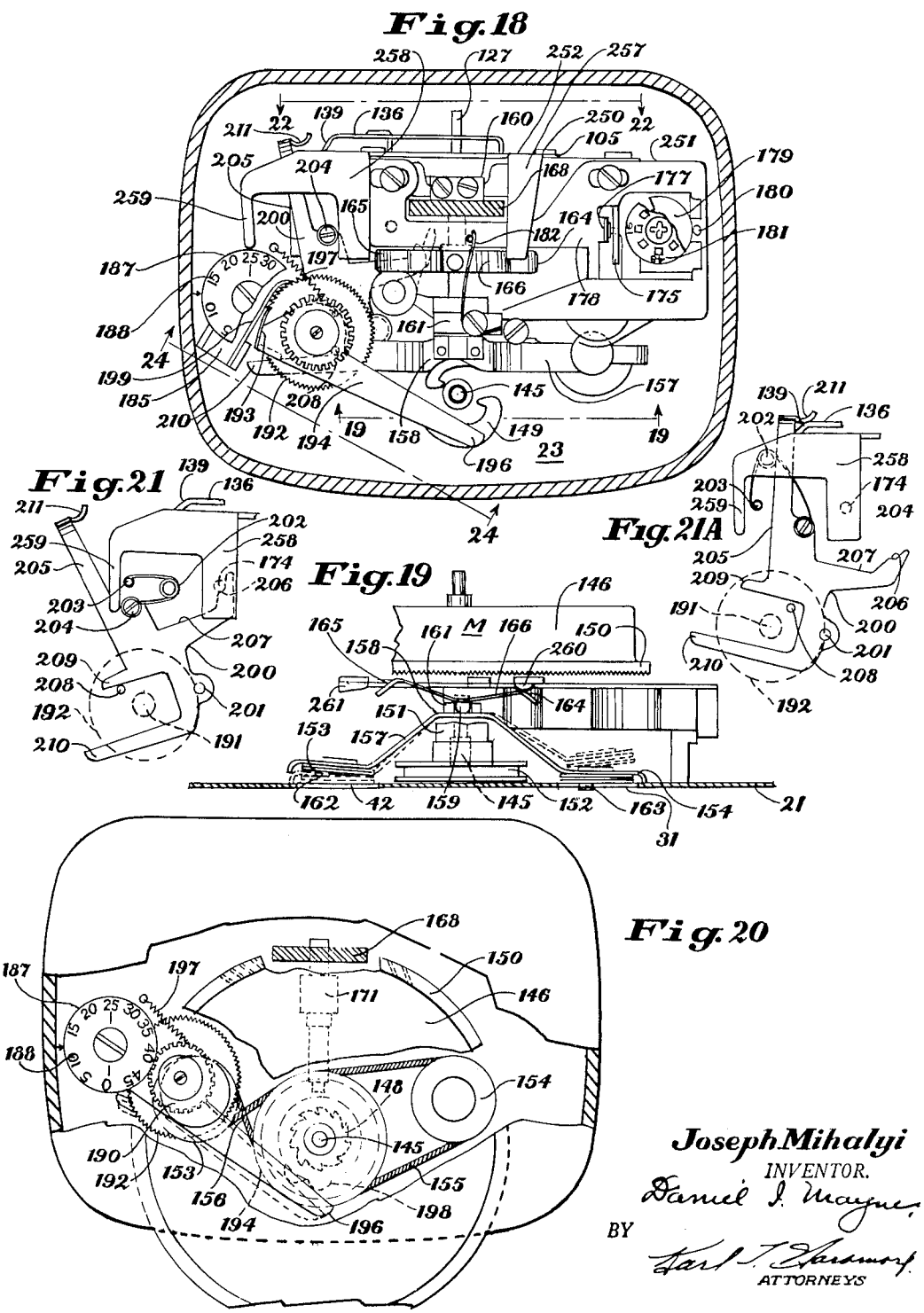

Feb. 21, 1956  J. MIHALYI  2,735,332
MOTION-PICTURE CAMERA
Filed June 21, 1954  8 Sheets-Sheet 7

Joseph Mihalyi
INVENTOR.
BY
ATTORNEYS

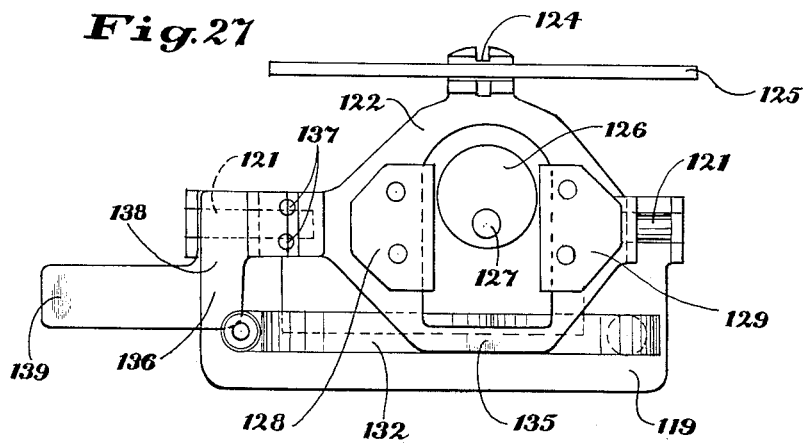
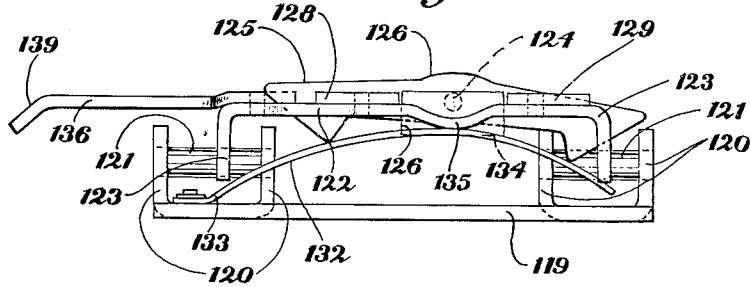
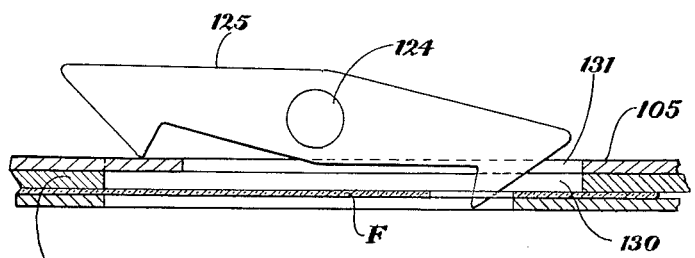

United States Patent Office 2,735,332
Patented Feb. 21, 1956

2,735,332

MOTION-PICTURE CAMERA

Joseph Mihalyi, Rochester, N. Y., assignor to Eastman Kodak Company, Rochester, N. Y., a corporation of New Jersey Application June 21, 1954, Serial No. 437,922

19 Claims. (Cl. 88—16)

My invention relates to a motion-picture camera of the type in which a film strip is run through the film gate in opposite directions to successively expose opposite longitudinal halves of the film, and particularly to such a camera which can be easily threaded and possesses a series of interlocks which ensures the two halves of the film being exposed in the proper sequence.

The primary object of the present invention is to provide a motion-picture camera which is adapted to feed a film strip from a supply roll to a take-up core in one direction for exposing one half of the width of the film and reversing the drive of the film to rewind the film onto the supply roll for exposing the other half of the width of the film.

Another object is to provide an automatic threading means for motion-picture cameras which makes the camera as easy to use and load as a magazine camera.

Further objects are to provide such a camera with a gate having two exposure apertures adapted to be alternately covered by a movable mask when an objective is shifted from optical alignment with one exposure aperture and into optical alignment with a second exposure aperture; a shiftable driving means for driving the film in opposite directions, including an intermittent claw at the film gate, and means for shifting said drive when the objective is moved between its two positions; means for automatically locking the film drive after a length of film just short of that contained on the supply roll has been fed onto the take-up core; means for releasing said locking means when the film drive is shifted; means for locking the drive shifting means until a film is threaded into the camera; means for removing the film claw from the gate when the film is rewound onto the supply roll so that a new film can be readily threaded into the gate.

A further object is to provide certain features adaptable to a motion-picture camera of this type which are equally useful and adapted for use on conventional motion-picture cameras in which the film is fed in only one direction for complete exposure.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawings, in which:

Fig. 5 is an enlarged detail view of the take-up core in its threading position, and showing the film clutch thereon and how it receives the end of a film strip when the same issues from the film gate;

Fig. 6 is an enlarged detail view of the take-up core moved part way to its running position, and showing how the film clutch positively engages the end of the film strip to attach it to the core;

Fig. 7 is an enlarged detail view showing how the film clutch on the take-up core is adapted to release the film end when the same is pulled therefrom by the film feeding mechanism when moving the film toward the supply spindle.

Fig. 8 is a sectional detail taken through the take-up core, and showing the driven clutch elements thereon;

Fig. 9 is an enlarged perspective detail view of the front end of the camera, and showing how the film strip is fed from the supply spindle and through a double apertured gate for the successive exposure of the two halves of the film width;

Fig. 10 is a front elevational view of the objective shifting mechanism, with the cover plate and objective removed, and showing the objective mount in alignment with one of the exposure apertures for exposing one-half of the width of the film;

Fig. 11 is a view similar to Fig. 10, and showing the objective mount shifted to alignment with the other exposure aperture for exposure of the other half of the film, but showing the camera in an upside-down position rather than inverted for use;

Fig. 11A is a sectional view taken substantially on line 11A—11A of Fig. 11;

Fig. 12 is a schematic view of the shutter, and showing its relation to the two exposure apertures in the film gate;

Fig. 13 is an enlarged sectional detail of the upper part of the front wall of the camera, and specifically showing the interlock for latching the objective turret against movement until film is threaded through the gate;

Fig. 14 is a view taken substantially on line 14—14 of Fig. 13;

Figs. 15 and 16 are detailed views of the end of the camera containing the supply spindle, and showing how a pivoted member forming a part of the film guideway permits the supply spool to be moved between its threading and running positions while at the same time lying adjacent the spool periphery to direct the film end into the guideway when the spool is in its threading position;

Fig. 17 is a detail view taken substantially on line 17—17 of Fig. 16, and showing how said pivoted member of the film guideway is mounted and operates;

Fig. 18 is a side elevational view of the camera, with the side wall and spring motor removed, and showing a general view of the mechanism;

Fig. 19 is an enlarged elevational view taken substantially on line 19—19 of Fig. 18 but with the spring motor in place, and showing the shiftable drive for the supply spindle and take-up core clutches;

Fig. 20 is an enlarged side view of the camera, and showing how the spring motor drives the clutch for the supply spindle and take-up core as well as the film counter mechanism;

Fig. 21 is an enlarged schematic view showing how the counter mechanism operates to stop the camera drive after one-half of the film width is exposed;

Fig. 21A is a view similar to Fig. 21 but showing the counter mechanism in its second extreme position and how it operates to lift the claw from the film gate at the end of the second film run or after a film is completely exposed;

Fig. 25 is an enlarged sectional detail view through the film gate, and showing how the mask for the exposure apertures engages and lifts one end of the claw from the film path to shift the direction of the claw drive as regard to the film;

Fig. 26 is an enlarged side elevational view of the pull-down mechanism looking from the camera body toward the objective; and Fig. 27 is a plan view of the pull-down mechanism shown in Fig. 26.

Generally speaking, my proposed motion-picture camera is disclosed as one of the 8 mm. type adapted to accommodate a standard 25-foot spool of 16 mm. film which is loaded by opening a hinged hatch at the top end wall of the camera casing. The hatch member carries a supply spindle onto which the spool is placed. This brings the outer convolution of the loaded spool in line with a film guideway, including a gate, so that by rotation of the spool, the leader of the film feeds straight into the open gate and onto the take-up core where the film comes to a stop. The film end is positively retained on the take-up core by means of a spring clutch surrounding the core. After the film end is attached to the take-up core, the hatch member is closed and this moves both the supply spindle and the take-up core to their running positions and completes the threading operation so that the camera is ready for operation in the usual manner. With the turret, which carries the objective, the view finder and the camera release button, moved to the first run position, the film drive is set up to drive the film from the supply spool to the take-up core for the successive exposure of one-half of the film width. As exposure along the first half progresses and reaches the 25-foot mark, a stop mechanism, associated with the counter mechanism, automatically stops the operation of the camera independently of the manually-operated release before the film is completely run off of the supply spool. At this time the objective turret is rotated 180° for the second run of the film. During this rotation of the turret, the take-up core is declutched, and the supply spool is clutched; also, the opposite end of the pull-down claw is brought into operating position, and now the camera is ready for exposure of the second half of the width of the film. The camera is turned upside down for this second run, the finder having been inverted with rotation of the turret. As the exposure progresses along the second half of the film and reaches the 50-foot mark, the film is pulled off of the take-up core and the stop mechanism associated with the counter mechanism automatically withdraws the film claw out of the film gate so that the camera is ready for rethreading. To eject the exposed spool of film, the hatch cover is unlatched, opened, the exposed spool lifted off the supply spindle, and a new spool loaded as described.

Figure 2:
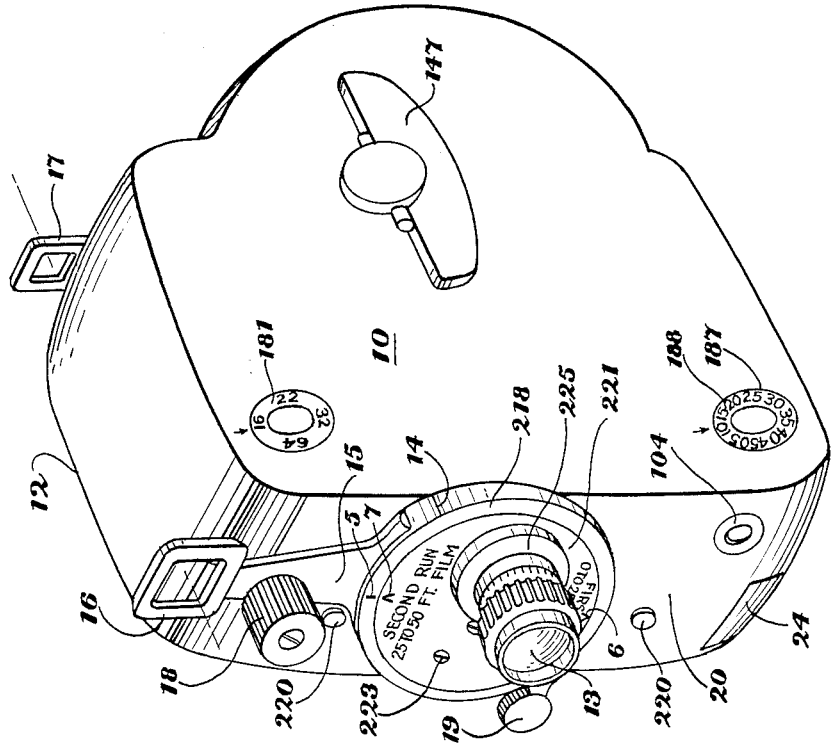
Fig. 2 is a view similar to Fig. 1, but showing the camera turned upside down and the parts adjusted for exposure of the second half of the film width.
Figure 1:
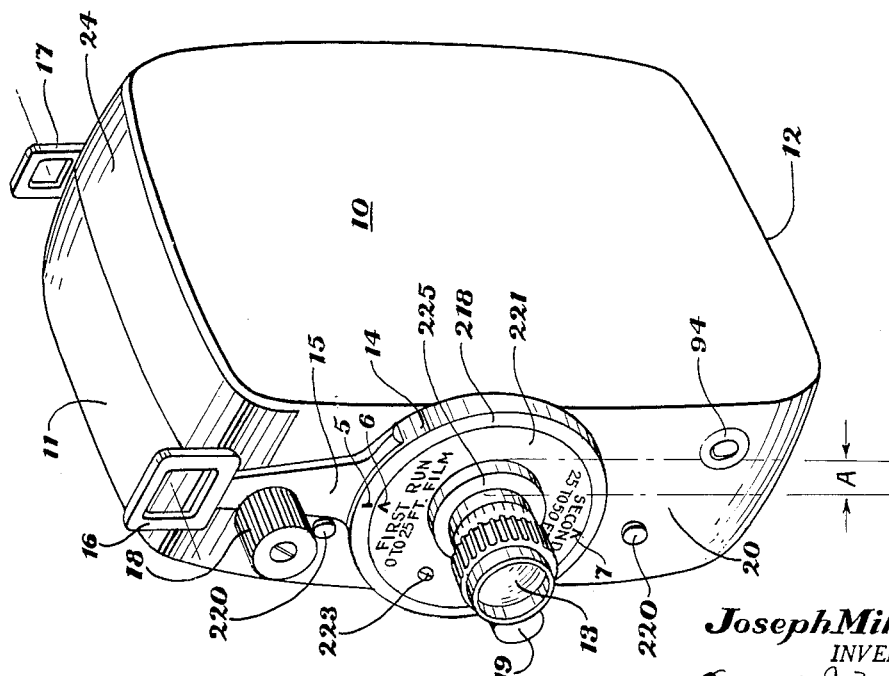
Fig. 1 is a perspective view showing a motion-picture camera constructed in accordance with one embodiment of my invention and in a condition for use in exposing the first half of a film strip.

Looking now at Figs. 1 and 2, the camera casing 10 is generally rectangular in shape and is provided with substantially identical top and bottom walls 11 and 12, respectively, because the camera is turned upside down between film runs. Looking at these figures, it will be noticed that opposite side walls are seen, since Fig. 1 shows the camera in a position for exposing the first half width of the film and Fig. 2 shows the camera inverted for exposing the second half width of the film. An index 5 carried by the rotatable part of the turret cooperates with one or the other of two pointers 6 or 7 carried by a fixed part of the turret to visually indicate, with the aid of legends on the fixed part of the turret, in which position the turret is at any time. The camera objective 13 is mounted within a turret 14 oscillatably mounted on the front wall 20 of the camera to move through 180° between a first position, see Fig. 1, in which it aligns the objective with one exposure aperture in the film gate to expose one-half of the film, and a second position, see Fig. 2, in which the objective is shifted laterally to be aligned with the other exposure aperture in the gate, as will be fully described hereinafter. The turret 14 carries an arm 15 on the end of which the front finder element 16 is mounted so that when the turret is shifted between its two positions, the finder is also shifted and the camera must be turned upside down for use. In this instance, I have shown the rear finder element 17 as one which can be slidably mounted on the rear wall of the camera so as to be slid up into cooperative relation with the front finder element as its position changes. There will be two rear finder elements for such an arrangement, one adjacent the top and one adjacent the bottom wall, which will be selectively used as the turret is moved. It is pointed out that with certain camera designs both finder elements could be joined together so as to be swung from one end of the camera to the other as the objective turret is moved. The turret arm 15 carries a knob 18 which is grasped to turn the turret, and this knob is so mounted that it must be pulled outwardly in an axial direction to release the turret from a latched position, as will be later explained in detail. The camera release lever 19 is also mounted on the turret 14 adjacent the objective, and, as will be evident from an inspection of Figs. 1 and 2, occupies the same position on the camera relative to the finder, and hence the operator, whether the camera is being used to expose the first or the second half of the film. In Fig. 1 the separation A indicates the distance the optic axis of the objective moves when the turret is swung between its two positions, and likewise indicates the lateral separation between the two exposure apertures in the film gate. The camera casing is divided longitudinally by a mechanism plate 21 which divides the casing into a film compartment 22 and a mechanism compartment 23, Fig. 18, and to which plate most of the fixed parts are attached. In order to thread the camera with film, that portion of the top wall on the film side of the mechanism plate is formed as a hatch 24 and is supported by a bracket 25 pivoted to the mechanism plate at 26 so that the hatch can be opened to the threading position shown in Fig. 3. When the hatch 24 is moved to the closed or running position shown in Fig. 4, it will be held in this position by a latch, not shown, on the fixed part of the camera casing.

Rotatably supported on the bracket 25 is a supply spindle 27 having a fluted periphery which is adapted to drivingly engage the bore of a supply spool 28 of film F, which is of the type used in motion-picture apparatus and provided along one or both edges with a row of perforations. The end of the supply spindle extends slightly through the bracket 25 and has attached thereto a driven clutch member, indicated at 29, in the form of a disk having a pair of lugs struck up therefrom, one being indicated as 30, and extending axially of the spindle. As will be hereinafter described, when the supply spindle is moved to its threading position, this driven clutch is axially aligned with a driving clutch member 163 located below the mechanism plate 21 and having an upstanding lug extending through an opening 31 in the mechanism plate to be engaged by one of the lugs fixed to the driven clutch on the supply spindle. The opening 31 in the mechanism plate 21 is curved and extends to the edge of the plate to permit the driven clutch on the supply spindle to move between the threading and running positions without interference.

Figure 3:
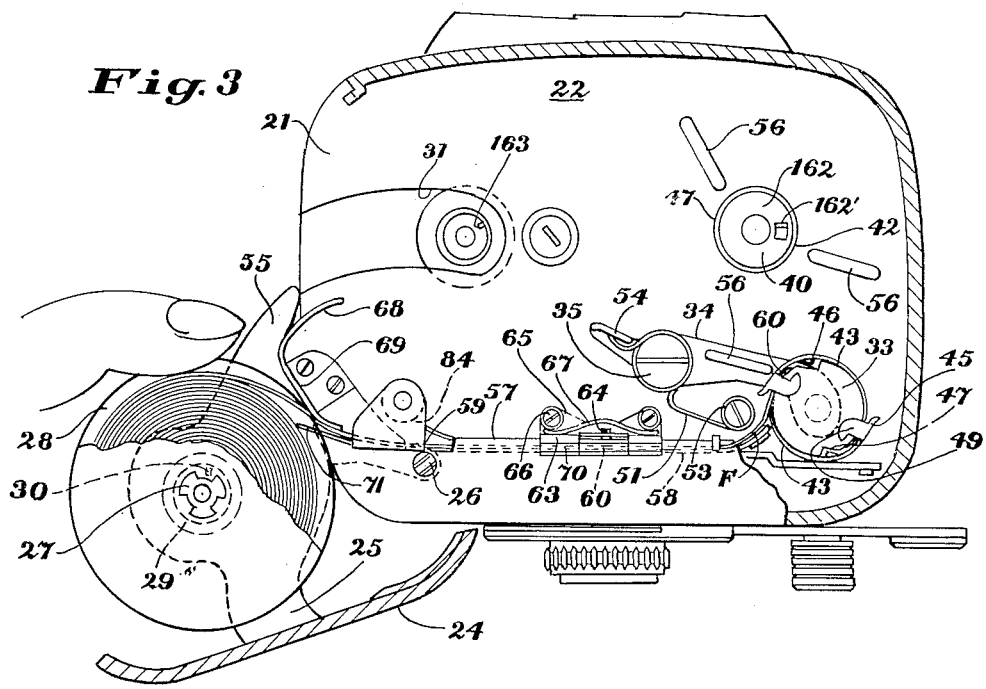
Fig. 3 is a side elevational view of a camera, with one side wall removed, showing the supply spindle and take-up core moved to a threading position.
Figure 4:
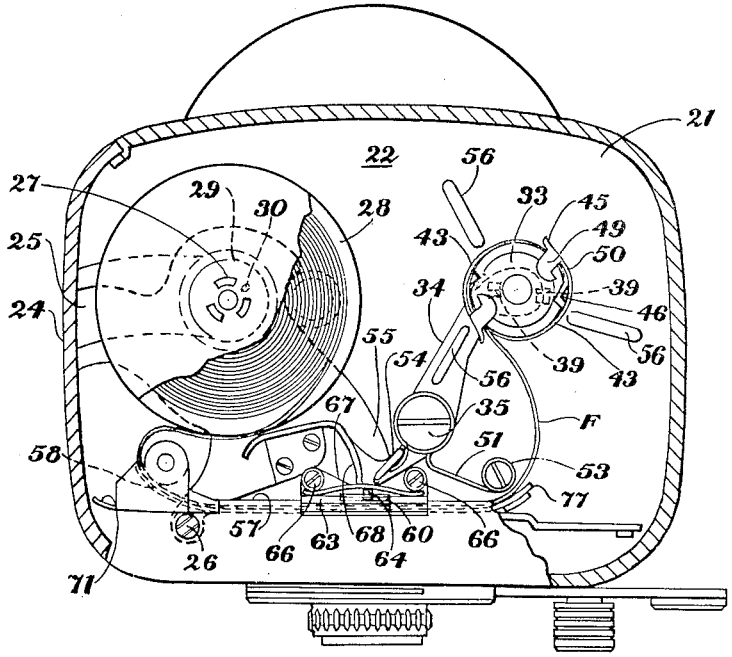
Fig. 4 is a view similar to Fig. 3, but showing the supply spindle and take-up core moved to their running positions.

At the other end of the casing a take-up core 33 is rotatably mounted on the end of a lever 34 pivoted on a screw 35 threaded into the mechanism plate so as to swing between a threading position, see Fig. 3, and a running position, see Fig. 4. As clearly shown in Fig. 8, this take-up core 33 is rotatably mounted on the lever 34 by having an axle 36 fixed to the core rotatably engaging a sleeved bushing 37 fixed in an offset portion of said lever. To the end of the axle extending through said bushing there is fixed a driven clutch member 38 in the form of a disk and two diametrically spaced upstanding lugs 39 extending axially therefrom. This is the same type of driven clutch member that is attached to the lower end of the supply spindle described above but not shown. When the take-up core is moved to its running position, see Fig. 4, this driven clutch member 39 is adapted to be axially aligned with a driving clutch 162 located below the mechanism plate 21 and having an upstanding lug 162' extending through an opening 42 in the mechanism plate to cooperate with one of the lugs 39 on the driven clutch of the take-up core when the driving clutch member is moved upwardly toward the mechanism plate, as will be hereinafter described.

The take-up core is provided with a film clutch which is adapted to automatically attach the end of a film to the core when it is pushed endwise through the film gate and toward the periphery of the core. The preferred embodiment of this film clutch is shown in Figs. 3–8 and comprises a pair of arcuate spring bands 43 fastened at one end 44, by any suitable means, at diametrically opposite points to the periphery of the take-up core. Each spring band has a natural tendency to hug the periphery of the take-up core, and each band is slightly longer than one-half of the circumference of the core so that the free end of one overlaps the fixed end of the opposite one. The free end of each band is turned up, as shown at 45, so as to provide a funnel-shaped throat into which the end of the film F is adapted to enter as it issues from the film gate. Each band has one or more teeth 46 struck up from each edge in alignment with the film perforations and which is adapted to extend into a notch 47 in the core periphery. As shown, the teeth 46 are shaped like saw teeth and are inclined so that a film, when pushed endwise onto the core, will cam the teeth and band away from the core and the film can be passed under a band until the end of the film strikes the attached end of the band. Now when the film is pulled in the other direction, the teeth 46 will snap into the first perforation in the film that they encounter and will positively hold the film end on the core. However, this construction is such that when the take-up core is in its running position, see Fig. 7, and the film is being pulled off of the take-up core, the direction of pull on the film is such that the last convolution of film will engage the turned-up end 45 of the spring band 43 and will force the same away from the core periphery and thus release the teeth 46 from locking engagement with the film perforations. Thus, the end of the film is automatically freed from the take-up core so that it can be completely rewound onto the supply spool after the exposure is complete. In order to prevent the free ends of the spring bands 43 from being pulled away from the take-up core periphery so far as to destroy their inherent resiliency, I provide means for limiting the movement of the band in this direction. To this end, I provide each edge of the free end of the spring bands 43 with a hook member 49 which overhangs the end of the core and extends radially inward thereof. These hook members 49 are adapted to engage projections 50 on the fixed end of the opposite band, and extending beyond the end of the core, to limit the amount the free ends of the bands are capable of springing away from the core periphery.

In Fig. 13 I have shown another embodiment of film clutch which might be used. Here the film clutch comprises a pair of spring bands 43' attached at one end to the periphery of the take-up core and having turned-up ends 45' adapted to form a throat for directing the film end onto the periphery of the core as before. In this case, the periphery of the core, or the fixed end of each of the bands, has a fixed tooth 46' extending therefrom and slanting so that the film end may be pushed onto the core periphery, but when the film is pulled in the other direction, the teeth will positively engage the first film perforation encountered to thereby hold the film end on the take-up core.

The take-up core 33 is normally moved to its threading position by a spring 51 coiled around the pivot screw 35 and having one end 52 fixed behind a film guide roller 53 extending up from the mechanism plate and having its other end 48 engaging the underside of a foot 54 on the arm. It is automatically moved to its running position when the supply spindle 27 is moved to its running position by closing the hatch 24, see Fig. 4. During the closing movement of the hatch 24, a nose 55 on the bracket 25 engages the foot 54 on the lever arm 34 to swing this arm counterclockwise about its pivot 35. When the take-up core is in its running position, see Fig. 4, three ribs 56, two on the mechanism plate and one on the arm having their tops lying in the same plane, act to support the film at the edge as it is wound up on the take-up core, thus eliminating the need for a supporting flange on the core.

Lying along the front wall of the camera casing between the supply spindle 27 and the take-up core 33 when they are in their threading position is a film guideway for directing a film end from the supply roll 28 onto the take-up core as it is fed therethrough by merely unwinding the film from the supply spool and pushing it through the guideway, see Fig. 3. This guideway comprises fixed rear and front guide surfaces 57 and 58, respectively, spaced apart by a distance slightly greater than the thickness of the film F plus edge guides, only the front ones being shown at 59, which altogether in effect constitute a channel for the film. Intermediate the ends of the film guideway is a film gate 60 where the film is accurately held in the focal plane of the objective for exposure purposes. The stationary part of the gate may comprise a front member of the guideway and includes two exposure apertures 61 and 62 in side-by-side relation and each of which covers one-half of the width of the film, see Figs. 9–11. The gate includes a presser pad 63 which is loosely mounted by having a pair of ears, not shown, at its rear edge engaging a pair of slots 64 in a plate 65 fixed to the mechanism plate 21 by screws 66. On the back of the presser pad 63 a bowed spring 67 is mounted. When the hatch 24 is closed, one end 68 of a film guide 69 on the bracket 25 engages this bowed spring and places the presser pad under spring tension. At this time two spaced turned-down fingers 70 on the front edge of the presser pad 63 engage the stationary part of the gate to limit the pressure which the pad can place on the film in the gate. With this construction, when the hatch is open for threading purposes, spring tension is removed from the presser pad of the gate and it is capable of being readily retracted by the film and hence does not obstruct the threading of the film through the gate.

Another, and the primary, purpose of the film guide 69 is to ensure the end of the film being directed into the guideway when it is pushed off of the supply spool, see Figs. 3 and 15. In other words, it extends beyond the periphery of the roll of film and prevents one from accidentally pushing the film end into the film compartment behind the film guideway. To prevent the film end leaving the supply roll 28 from following down and around the periphery of the spool and getting in front of the film guideway during threading, I movably mount a guide finger 71 at the entrance of the film guide, so that it will normally move out and engage the outer coil of the film roll in spaced relation to film guide 69 and form therewith a throat into which the film end enters and is directed into the guideway, see Fig. 15. During the closing of the hatch 24 the spool of film describes an arc and could not get by this guide finger unless it was free to move inwardly. To provide for this movement, I mount the guide finger 71 in the manner shown in Fig. 17. It will be noted that it is staked to the end of an arm 72 pivoted at one end 73 to a block 74 situated in the mechanism compartment of the casing. A spring 75 normally acts on the arm 72 to move the guide finger to its operative position, solid line position in Fig. 17, and one end of a slot 76 in the mechanism plate through which the arm extends limits the outward movement of said arm.

The front member at the exit end of the film guideway is curved rearwardly, as shown at 77, to direct the film end substantially tangentially of the take-up core and under one of the free ends of the spring bands 43. To ensure that one or the other of the film clutches will be in position to receive the film end as it leaves the film guideway, I fix a cam member 78, of the shape best shown in Figs. 5 and 6, to the mechanism plate. When the take-up core is swung from its running position to its threading position by the spring 51, one of the lugs 39 on the clutch member 38 of the take-up core, regardless of what position the core stops in, will engage the point 79 or the curve 80 of the cam and under the action of the spring will be oriented by said cam so that one of the free ends of the spring bands will be in a position to receive the film end as it issues from the guideway. In the event one of the clutch lugs is in a position to first engage the curve 80' of the cam 78, then the core will be rotated clockwise by such engagement and the opposite clutch lug will be brought into engagement with curve 80 of the cam and follow it down to orient the take-up core properly.

In Fig. 13 I have shown another embodiment of a mechanism for properly orienting the take-up core when it is moved to its threading position so that the film clutch on the periphery thereof will be in a position to engage a film leaving the guideway. In this instance, plug 81 is fixed to a mounting plate 82 in the casing and has a conical or sharpened point 83 which is adapted to engage between the clutch lugs 39' on the take-up core and thereby properly orient the core relative to the guideway.

After the film is threaded through the guideway and is attached to the take-up core, the hatch 24 is closed to complete the threading operation. As the hatch is closed, the film F is wrapped part-way around the film guide roller 84 to establish the necessary loop in front of the film gate. When the take-up core moves to its threading position, the film is pulled from the supply roll of film and is wrapped around the guide roller 53 to establish the lower loop behind the gate with the aid of the natural coiling tendency of the film. Now the film is ready to be run in one direction through the film gate for the first exposure of one-half of the width of the film, or 25 feet in the case in question. To do this the turret 14 must be swung to the position shown in Fig. 1 from that shown in Fig. 2, or where it is when the previous roll of film is completely exposed. Because the hatch 24 will not open with the turret in the first run position, since the front finder element 16 is in the way, the camera must be loaded before the turret is swung from the second run position to the first run position. In order to prevent rotation of the turret 14 to the first run position before the camera is reloaded, a latch mechanism for the turret is provided which will now be described.

Looking at Fig. 13, the turret 14 is provided with a knob 18 which is grasped to turn the turret between its two positions. This knob 18 is slidably and oscillatably mounted on a bearing sleeve 85 fixed to the arm 15 of the turret whose periphery is provided with a groove 86 adjacent the arm into which a radial lug 87 on the bottom edge of the knob is provided to engage to lock the knob against axial movement relative to the sleeve. At one end of the groove 86 the periphery of the sleeve is provided with a flat portion, indicated at 88, contiguous with the bottom of the groove so that if the knob is rotated on the sleeve until the lug 87 reaches this flat, it can be slid axially upward on the sleeve. Fixed to the knob 18 by a screw 89 is a latch pin 90 having an enlarged bearing surface 91 engaging the inside of the sleeve to guide the pin in its axial movement. A coiled compression spring 92 wrapped around the latch pin and situated between the enlarged bearing surface 91 and a lip 93 on the top of the sleeve tends to move the latch pin 90 and the knob 18 toward the arm, and in which position the end of the pin seats in a socket member 94 fixed to a supporting plate 95 inside of the camera casing. The coil spring 92 has its upper end fixed in a slot in the lip 93 of the sleeve and its lower end engaging a flat side 96 on the latch pin and the parts are assembled so that the normal tendency is for the spring to twist the knob 18 into a locking position in which the lug 87 thereon engages the groove 86 in the sleeve bearing.

To prevent pulling the knob 18 outwardly and thus release the latch pin from the socket 94, even if the knob is rotated to release it from the sleeve, until the camera is loaded with film, the following structure is provided. The lower end of the latch pin is provided with a groove 97 into which the end 98 of a lever 99 pivoted on a stud 100 is urged by a light spring 101. The wall of socket 94 is provided with a slot which permits the end 98 of lever 99 to move into and out of the groove 97 to latch the pin against withdrawal from the socket member. A pin 102 fixed to the lever 99 moves in a slot 103 in the stationary member of the firm guideway to a normal position, dotted line position in Fig. 14, where it lies in the film path and the end 98 of the lever engages the groove in the latch pin to lock the same against withdrawal. When a film is threaded through the guideway, it engages and moves the pin 102 out of the guideway and at the same time moves the lever 99 to the solid line position of Fig. 14. In this position of the pin 102, the end 98 of the lever is held out of locking engagement with the latch pin 90 and the knob 18 and the latch pin can be withdrawn from the socket, upon rotation of the knob 18 to an unlocked position, so that the turret can be shifted to the first run position. The front wall of the camera is provided with a second socket member 104 which the latch pin 90 is adapted to engage when the turret 14 is swung to its first run position, see Fig. 2, but since this socket is used only to lock and hold the turret in a given position, no locking means for the knob 18 is provided in the socket proper.

Figure 22:
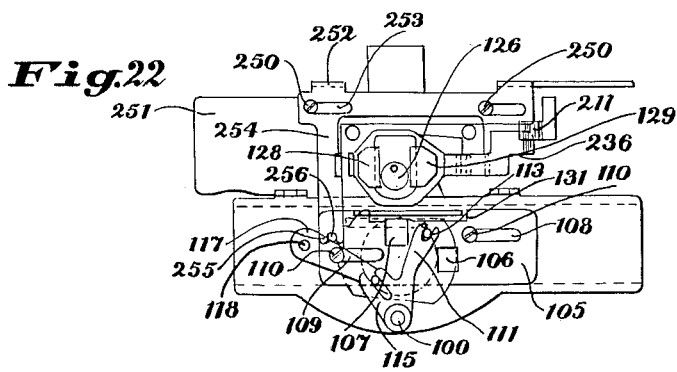
Fig. 22 is an elevational view taken from the front of the camera substantially on line 22—22 of Fig. 18, and showing the connection between the objective shifting mechanism and the mask for the exposure apertures along with the slide for releasing the drive mechanism and shifting the film drive.

Slidably mounted on the outside face of the stationary front member 58 of the film guideway is a mask 105 having a pair of openings 106 and 107, offset laterally as well as longitudinally of the film path, and which are adapted to be moved selectively into alignment with one or the other of exposure apertures 61 and 62 in the front member 58 of the guideway when the mask is slid between two different positions, see Fig. 22. Elongated slots 108 and 109 engaging pins 110 on the front member 58 of the guideway allow the mask to be slid longitudinally of the film path and the ends of the slots engaging the pins ensure alignment between one of the openings 106 or 107 in the mask with its respective exposure aperture. It will be understood that when the film is being moved through the gate in one direction for the exposure of one-half the width of the film the mask will be slid to one of its two positions for uncovering the proper exposure aperture in the gate and covering the other. When the film movement is reversed for exposure of the other half of the film, then the mask must be shifted to its second position, to uncover the exposure aperture which was previously covered. As will be hereinafter fully described, this mask 105 is automatically shifted between its two positions when the turret 14 is swung between its two positions and by use of a mechanism which includes bell crank 111 pivoted on stud 100 and having one forked end 113 engaging a pin 114 on the mask 105 and having a second forked end 115 engaged by a pin 116 carried on the end of a lever 117 fixed to a rotatable stud 118, see Figs. 14 and 22.

The film is intermittently advanced through the film gate in either direction by a claw mechanism which will now be described with reference to Figs. 26 and 27. This claw mechanism comprises a fixed supporting bracket 119 having two pairs of spaced upstanding ears 120 supporting rods 121 which extend parallel to the film path at the gate. A claw carrier 122 of the form best shown in Fig. 27 has a pair of perforated down-turned ears 123 which slidably and rotatably engage the rods 121 so as to allow the claw to move longitudinally of the gate and to pivot into and out of the film path. Loosely pivoted on the claw carrier by a stud 124 whose axis is intermediate and perpendicular to the axis of rods 121 is a double-ended claw 125. This claw is reciprocated by a cam 126 eccentrically mounted on a shaft 127 which engages two followers 128 and 129 to reciprocate the claw. The front stationary member 58 of the film gate and the mask 105 are provided with elongated slots 130 and 131, respectively, through which the claw ends are adapted to extend into the film path of the gate to engage the film perforations in a known manner. The claw is normally moved toward the film path by a leaf spring 132 fastened at one end 133 to the supporting bracket and having its bowed end 134 engaging the underside of a deformed portion 135 in the claw carrier at one side of the rods 121. That portion of the carrier engaging the spring 132 is deformed, as shown, and that portion of the spring engaged thereby is bowed so as to reduce the friction resulting from this engagement which will result from the reciprocating action of the claw mechanism.

The direction of drive of the claw will depend upon which end of the claw is allowed to penetrate into the film path at the gate. In other words, since this is a well-known ratchet-type pull-down claw, if one claw end is held out of the film path and the other is allowed to enter the film path, the claw will drive the film in one direction. To reverse the direction of the film drive by the claw, it is merely necessary to reverse the relationship of the claw ends relative to the film path. This is accomplished in the present instance by making the slot 131 in the mask 105 through which the film claw ends are adapted to extend of such length that when the mask is in one of its two positions, the mask frees one claw end and holds the other claw end out of the film path, see Fig. 25. Accordingly, the parts are so arranged that when the mask 105 is shifted to uncover one exposure aperture in the film gate, at the same time the mask engages and raises the claw end not appropriate to the direction of film movement corresponding to the uncovered exposure aperture and holds it from operative relation relative to the film path. During this time, the raised claw end merely reciprocates along the face of the mask. When the mask is shifted to uncover the other exposure aperture in the gate, it engages and raises the other claw end from the film path and at the same time allows the previously inoperative claw end to drop into the film path and become operative to drive the film in the other direction through the gate. It will thus be seen that the film claw drive is automatically reversed at the same time as, and by, swinging of the turret 14 between its two positions is effected.

In order to permit a new film to be threaded into the camera by merely pushing the end thereof through the film gate as above described, it is advisable that both ends of the film claw be retracted from the film gate at the time a fully exposed film is rewound upon the supply spool. To this end, the claw carrier 122 has a retracting arm 136 fixed at one end to the top thereof in any suitable manner, as by rivets 137. As clearly shown in Fig. 27, this arm has an offset 138 therein so that the free, turned-down end 139 thereof is to one side of the rods 121 on which the claw carrier is pivoted. Accordingly, if a downward pressure sufficient to overcome the upward pressure of spring 132 is applied to the end 139 of arm 136, the claw carrier and the claw thereon will be pivoted on rods 121 in a direction to move the claw ends completely out of the film path of the gate. As will be hereinafter fully described, this action is automatically accomplished by a part of the film counter mechanism at the time a film strip has been fully exposed and has been rewound upon a supply spool.

The shutter used on this camera may be constructed as shown in Fig. 12. It comprises a disk 140 fixed to the shaft 127 and having concentrically arranged arcuate openings 141 and 142 which are adapted to be respectively aligned with opposite ones of the two exposure apertures 61 and 62 in the film gate. The arcuate lengths of the two openings 141 and 142 are so calculated that the exposure through the two exposure apertures will be equal for a given speed of shutter rotation. It will be observed that there is a rotational position of the shutter in which both exposure apertures will be closed, see Fig. 12. A stop latch 143 on the shaft 127 is so oriented with respect to the camera release lever and this shutter position that any time the camera is stopped, the shutter will take up this position to prevent accidental exposure of the film.

The driving mechanism for the different movable parts of the camera will now be described, referring particularly to Figs. 18–20 and 23. Fixed to, and extending from, the mechanism plate 21 is a supporting spindle 145 on the upper end of which is mounted a spring motor, indicated generally at M. This spring motor is of the type, and is mounted on the spindle as shown in detail in U. S. Patent 2,165,362, so that a complete description of the same will not be undertaken herein. It will suffice to point out here that the motor comprises an outer cylindrical casing 146 which has one end of a coil spring encased thereby connected to it to rotate the casing. The other end of the coil spring is connected to a core rotatably mounted on the spindle 145 so that the spring can be wound by a handle 147, see Fig. 2, on the outside of the camera casing which is connected to the core by a one-way clutch. In order to prevent the core from rotating when the spring motor is released, or when the motor is wound up, a ratchet member 148 is mounted on the core and this ratchet is engaged by a pair of pawls 149 pivoted to the mechanism plate.

The important point concerning the motor drive is that it is the cylindrical casing 146 which is rotated by the spring and constitutes the prime moving element. Fixed to the lower outside edge of the casing is a ring gear 150 having spiral teeth, while fixed to the bottom plate of the casing is a sleeve member 151 rotatably engaging the spindle 145. To the lower end of this sleeve member 151 there is fixed a driving pulley 152 which is driven by the spring motor. The pulley 152 is connected to driven pulleys 153 and 154 by a spring belt 155 which is twisted at point 156 to cause the driven pulleys to be rotated in opposite directions. The driven pulleys 153 and 154 are rotatably mounted on the opposite ends of lever 157, the offset intermediate portion of which is connected to the stub shaft 159 oscillatably mounted in bearings 160 and 161 connected to the mechanism plate 121. On the lower face of each of the driven pulleys 153 and 154 there is a clutch member 162 and 163, respectively, which are adapted to cooperate with the clutch members 38 and 29 on the take-up core 33 and supply spindle 27, respectively. The clutch members 162 and 163 are adapted to extend through openings 42 and 31 in the mechanism plate to alternately engage their corresponding clutch members 38 and 29 on the take-up core and supply spindle. When the lever 157 is tipped to the position shown in solid lines in Fig. 19, the clutch member 163 is moved into driving relation with the clutch 29 on the supply spindle 27 whereas the clutch member 162 is moved out of driving relation with the clutch on the take-up core 33. In this relationship of parts, the film is driven from the take-up core to the supply spindle for exposure of one-half the width of the film during the second run of 25 feet of film. When the lever 157 is oscillated to the dotted line position of Fig. 19, the drive to the supply spindle is cut off and that to the take-up core is connected so that the film drive is in the opposite direction. This lever is tilted between its two positions by alternately applying a downward pressure to one or the other of the bowed ends 164 and 165 of a spring 166 connected at its center to the oscillatable stub shaft 159. This shifting of the drive between the take-up core and the supply spindle will take place automatically when the turret 14 is rotated between its two positions, as will hereinafter be described.

Figure 23:
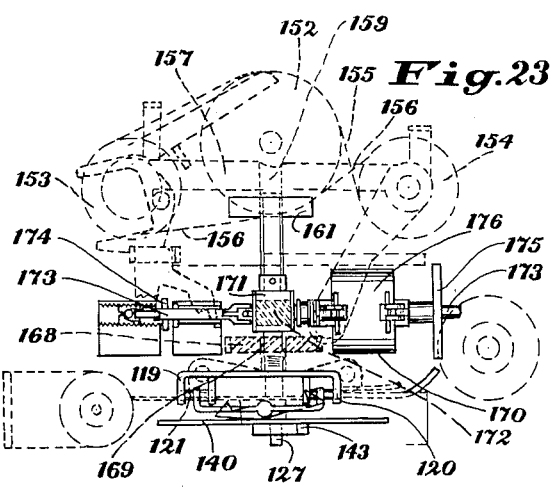
Fig. 23 is a schematic view of the drive mechanism of the camera, and particularly showing how the drive for the governor, pull-down claw and shutter are derived from the spring motor.

The drive for the shaft 127 which carries the cam 126 for the pull-down claw and the shutter 140 is from the ring gear 150 of the motor, through a spiral gear 168 rotatably mounted on the stub shaft 159, to a pinion 169 fixed on shaft 127, which lies directly below and parallel to stub shaft 159, see Fig. 23. For controlling the speed of shaft 127, I connect a conventional type of centrifugal governor 170 thereto through a gearing consisting of a spiral gear 171 on shaft 127 meshing with a spiral gear 172 fixed to the rotatable shaft 173 of the governor. The governor shaft has a pin 174 sticking diametrically through the same which is engaged by a stop member controlled by the counter mechanism to automatically stop the drive at the end of the first run of 25 feet of film, as will be fully described hereinafter. The governor includes the usual brake wheel 175 which is moved axially of the governor shaft as the weights 176 fly outwardly under running conditions. The speed of the governor, and hence that of the drive, is controlled by a brake shoe 177 carried by a slide 178 against which this brake wheel moves. The position of this brake shoe is adjusted by a radial cam 179 engaging a turned-down lug 180 on the slide, and which cam is adjusted from the outside of the camera casing by a speed dial 181 marked in speeds of 16–48 frames per second, see Fig. 18. The slide 178 is normally acted on by a spring 182 which holds the lug 180 thereon in engagement with the cam 179.

Figure 24:
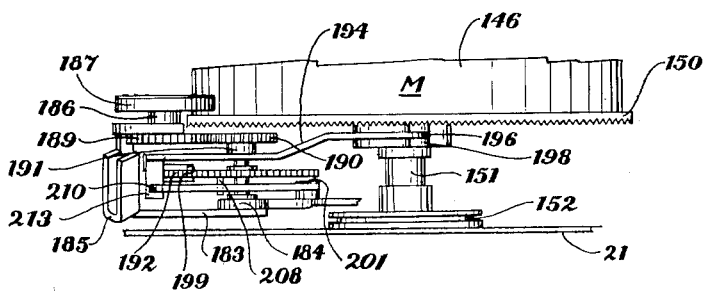
Fig. 24 is a side elevational view taken substantially on line 24—24 of Fig. 18, and showing the film counter mechanism.

In this camera it is imperative that the film feed by automatically stopped when the film has been fed through the camera in one direction for the exposure of one-half the width thereof and before the film has been completely run off of the supply roll. To this end, I provide the camera drive with a stop mechanism which is automatically operated by a counter mechanism which also drives the film footage indicator. Referring now to Figs. 18 and 24, fixed by an arm 183 to a casting 184 supported on the mechanism plate 21 is a U-shaped bracket 185 to one upstanding leg of which is fixed a bearing 186. Rotatably mounted in this bearing is a stub shaft, on one end of which is carried a dial 187 which extends to the outside of the camera casing and whose face carries a film footage scale 188 arranged to cooperate with an index mark on the camera casing. This dial is driven by a gear 189 fastened to the other end of the stub shaft and which is driven by a gear 190 fixed to the upper end of a shaft 191 journalled in a bearing portion of casting 184. The shaft 191 and gear 190 is adapted to be driven through a ratchet 192 fixed to the shaft, said ratchet being stepped clockwise, looking at Figs. 18 and 20, by a pawl 193 fixed on the end of a lever 194 pivoted on the shaft 191. The other end 196 of this lever 194 is normally urged against the sleeve 151 connected to and driven by the motor casing by a spring 197. On that portion of the sleeve engaged by the end 196 of the lever there is a radial cam 198 which is adapted to engage said lever once during each rotation of the sleeve and to pivot the lever clockwise. Each clockwise movement of the lever about its pivot causes the pawl 193 to move the ratchet clockwise a given amount and to consequently step the footage dial counterclockwise. A second pawl 199 fixed to the second leg of the U-shaped bracket 185 engages the ratchet 192 to prevent accidental movement of the same in a counterclockwise direction as the first or feeding pawl oscillates relative thereto.

In order to automatically stop the drive mechanism when the film has been fed through the camera in one direction for the exposure of one-half the width thereof, and before the film has been completely pulled off the supply spool, the following latch mechanism is associated with the described counting or film measuring mechanism. A multiple arm lever 200, of the form best shown in Fig. 21, is pivoted on the casting at point 201 to one side of the shaft 191 carrying the ratchet 192. This lever 200 is acted upon by a hairpin spring 202 fixed at one end to a pin 203 on the casting and at the other end to a pin 204 extending upwardly from the arm 205 of the lever. This hairpin spring merely serves to snap the multiple arm lever to one or the other of its two extreme positions about its pivot point when the lever is moved just past the dead center position intermediate said two extreme positions. In one extreme position of the multiple arm lever, see Fig. 21, a notched end 206 in the arm 207 thereof engages the stop pin 174 extending through the governor shaft 173 and stops the drive mechanism. This is arranged to occur when the film has been run through the camera in the first direction and one-half of the width is exposed.

The swinging of the multiple arm lever 200 from one of its extreme positions just past the dead center position where the hairpin spring takes over to snap it to the other extreme position is accomplished by pin 208 extending downwardly from the ratchet 192 and adapted to engage either arm 209 or arm 210 of the multiple arm lever which embrace the shaft 191 on which the ratchet is mounted. Looking at Fig. 21, since the ratchet is rotated clockwise, when the pin 208 carried thereby is moved into engagement with arm 209 of the multiple arm lever 200, it will cause the latter to pivot in a clockwise direction until, when it just passes the dead center position, the hairpin spring 202 will snap the lever to its opposite extreme position. In this position, see Fig. 21A, as will be hereinafter described, it will automatically remove the film claw from the film path at the gate so that the camera can be rethreaded, because at this time the second run of the film has been completed and the film has been completely rewound upoon the supply spool. Now when the pin 208 contacts the other arm 210 of the multiple arm lever 200, as it will when the next film is run through the camera in the first direction and approaches the end of the first run, it will swing the lever 200 counterclockwise about the pivot point 201, and when it just passes the dead center position, the hairpin spring 202 will snap it to the other extreme position shown in Fig. 21, whereupon the drive will again be automatically stopped.

When the film reaches the end of the second run and the film is completely rewound on the supply spool, it is desirable to withdraw the film claw from the film gate so that a new film can be threaded therethrough. At the same time there is no need to paralyze the drive mechanism since it might be desirable to run the camera for demonstration purposes, but it is necessary to disconnect the counter mechanism from the drive so that it will not get out of synchronism with the film footage moved through the camera. All of these desirable results are accomplished by the counter mechanism through the multiple arm lever 200, as will now be set forth. When the second run of the film has been completed and the film has been completely rewound upon the supply spool, the combined action of pin 208 on the ratchet 192 and the hairpin spring 202 will have pivoted multiple arm lever 200 to its other extreme position, shown in Fig. 21A. In this position the curved end 211 on the end of arm 205 of the lever 200 will have cammed over the turned-down end 139 on the retracting arm 136 of the claw carrier and by pressing down on this arm, will pivot the claw carrier 122 about rods 121 to lift the claw 125 out of the film gate, as above described. At the same time the end of arm 210 on the multiple arm lever 200 will have engaged a depending lug 213 on the lever 194 and will have pivoted the lever about its pivot point against the action of spring 197 to swing the end 196 of lever 194 out of the path of the cam 198 which normally operates the counter mechanism.

Referring now to Figs. 1, 2, 10 and 11, the mounting for the camera objective 13, and the means for swinging the same between its two positions, will be described. The objective 13 is carried by a mount 214 which is fixed to the rotatable stud 118 rotatably journalled in a casting 216 having an upstanding ring 217 thereon. This permits the objective to be swung between one position in which it is in optical alignment with one of the exposure apertures 62 for the first film run, see Fig. 10, and a second position in which it is in optical alignment with the other exposure aperture 61 for the second film run. The objective is moved between its two positions by swinging the turret 14 through 180°, said turret comprising a ring 218 having a groove in its lower face riding on the upstanding ring 217 formed on the casting 216, see Fig. 11A. This ring 218 is held in assembled relation on ring 217 by a cover plate 221 held to two tapped bosses 222 on the casting 216 by screws 223, see Figs. 1, 2 and 11A. This plate will lie in a cutout 224 in the upper edge of ring 218 so as to lie flush therewith. This plate also includes an elongated slot, not shown, to permit the objective to shift between its two positions, this elongated slot being covered at all times by a disk 225 held between the plate and the objective when the latter is threaded into the mount, see Figs. 1 and 2. As pointed out before, the turret 14 is swung by gripping the knob 18 on the finder arm 15 fixed to the turret and swinging the turret between its two positions in a direction to the right of the center, looking at Figs. 10 and 11. Stop pins 220 extend from the front wall of the camera to limit the swinging movement of the turret at its two extreme positions. A latch pin 90 fixed to the knob 18, see Fig. 13, enters one socket member 94 in the front wall of the camera to define the operative position of the objective, and enters a second socket member 104 at the other end of the camera to define the other operative position of the objective. Looking again at Figs. 10 and 11, when the turret 14 is moved to the position shown in Fig. 10, a cam 226 fixed to the inside of ring 218 engages a spring 227 wrapped around the outside of the objective mount 214 and cams the mount into alignment with one exposure aperture. When the turret is swung clockwise from the Fig. 10 position to its other position shown in Fig. 11, the cam 226 moves from the mount and a finger 228 extending radially inward from ring 218 engages the free end 229 of the spring wrapped around the mount and moves the mount into alignment with the other exposure aperture. Stop pins 230 and 231 accurately position the objective mount with respect to the different exposure apertures. Having the cam 226 and finger 228 engaging the spring 227 to move the mount and hold it in its end two positions, rather than engaging the mount directly, provides means for resiliently holding the mount in its two positions and eliminates the need for close tolerances in these parts.

The drive mechanism of the camera is held against operation by the nose 232 of the latch lever 233 which engages the stop latch 143 on the shutter shaft 127. This latch lever 233 is pivoted at point 234 on the casting 216 and is normally urged by a spring 235 in a direction such that its nose 232 is moved toward the shaft 127. The camera manual release lever 19 is carried by the turret 14 and must, therefore, be capable of releasing latch lever 233 when in either of two different positions spaced 180° apart, see Figs. 10 and 11. To this end, the latch lever 233 is provided with two upstanding lugs 237 and 238 at its opposite ends, the latch lever being moved to a release position when pressure is applied to lug 237 in a direction radially inward of the ring 218 and when pressure is applied radially outward of the ring on lug 238. The release lever 19 is pivoted at point 239 to a projection on ring 218 to move therewith, and it terminates in a double-ended arm 240 having lugs 241 and 242 extending downwardly therefrom. With the turret 14 rotated to the position shown in Fig. 10, downward pressure on the end of release lever 19 will cause lug 242 to engage lug 238 on the latch lever 233 and move the nose 232 thereon out of locking engagement with the stop latch 143 on the shaft 127. When the turret 14 is turned to its other position, see Fig. 11, the other lug 241 on the double-ended arm 240 of the release lever 19 will engage opposite lug 237 on the latch lever 233 so that pressure on the release lever, in the direction of the arrow, will again release the camera drive. In actual operation the camera will be turned end for end for use when the turret 14 is rotated so that actually release lever 19 will occupy the same position relative to the camera and the operator during each film run. However, in order to more clearly show how the release lever 19 works on the latch lever 233 in the two different positions of the turret, I have shown in Fig. 11 the turret reversed with respect to the Fig. 10 position thereof but with the camera still inverted, and in the position it will assume when being used. Since the latch lever 233 and release lever 19 are mounted on opposite sides of the casting 216, the casting is provided with an arcuate slot 243 to allow the lugs on the double-ended arm 240 to extend therethrough to engage the lugs on the latch lever 233 and still move relative to the casting.

Referring now to Figs. 18, 19, 21 and 22, I will describe how the film driving mechanism is automatically reversed and unlatched for the second run when the turret 14 is swung from its first run position shown in Fig. 1 to its second run position shown in Fig. 2. Slidably mounted on pins 250 extending from the front wall 251 of the casting 216 of the front of the camera is an L-shaped slide 252 having slots 253 engaging pins 250. An arm 254 connected in this slide and extending transversely, and to one side of the optical axis, has a slotted end 255 engaging a pin 256 carried by the masking plate 105. By virtue of the pin and slot driving connection (255, 256), when the mask 105 is shifted by rotation of the turret, as above described, the slide 252 is moved between two extreme positions. That portion of the slide 252 extending parallel to the optic axis comprises two spaced fingers 257 and 258 and a third finger 259, see Fig. 18. As more clearly shown in Fig. 19, each of fingers 257 and 258 have turned-down ends 260 and 261, respectively, which are adapted to alternately ride upon one or the other of the ends 164 and 165 of spring 166 to shift the clutch members 162 and 163 as previously mentioned. In Figs. 18 and 19, the slide 252 is shown moved to one extreme position in which the end 260 of finger 257 engages and presses down on the end 164 of spring 166 to move pulley 154 and clutch member 163 connected thereto into driving position, while end 261 of finger 258 moves away from end 164 of spring 166 to move pulley 153 and clutch member 162 carried thereby to an inoperative position. When the slide 252 is moved in the other direction by the next rotation of the turret 14, the end 261 of finger 258 will then engage the end 165 of spring 166, while finger 257 releases end 164 thereof, and the drive to the supply spindle and take-up core will be reversed. As set forth above, the shifting of the mask 105 between its two positions reverses the direction of drive of the film claw by alternately engaging, and demobilizing, one or the other claw end thereof; and this shifting of the claw drive is properly coordinated with the shifting of the drive between the supply spindle and the take-up core so that they will both be shifted at the same time and in the same sense.

Looking at Figs. 18 and 21, the purpose of the third finger 259 on slide 252 is to release the notched end 206 of arm 207 on multiple arm lever 200 from locking engagement with the pin 174 extending through the governor shaft 173, and thus unlock the drive mechanism, when the turret 14 is rotated to its second run position. Remembering that the slide 252 and the multiple arm lever 200 will take up the position shown in Fig. 21 at the end of the first run of film, it follows that when the turret 14 is moved to its second run position, see Fig. 2, the slide 252 will be moved to the right, looking at Fig. 21, and the finger 259 thereon will engage pin 204 on the multiple arm lever 200 and pivot the latter clockwise to move the notched end 206 of arm 207 out of the path of the pin 174 in the governor shaft and thus release the drive mechanism. At the same time the fingers 257 and 258 of the slide will shift so as to properly reverse the drive to the supply spindle and take-up core.

When the second film run is completed, and the film is completely exposed, the multiple arm lever 200 will assume the position shown in Fig. 21A wherein the end of the arm 205 will have engaged the end 139 of claw retracting arm 136 to lift the claw out of the film path of the gate. At this time the pin 204 on arm 205 lies adjacent the finger 258 on slide 252 so that after the camera has been rethreaded with a new film and the turret has been rotated to the first run position, the movement of the slide 252, in addition to reversing the drive to the supply spindle and take-up core, will cause finger 258 to engage pin 204 and pivot the multiple arm lever 200 counterclockwise to the position shown in Fig. 18, whereupon the end of arm 205 will release the film claw retracting lever 136 and allow the claw to drop back into normal driving relation with the film in the gate.

By way of reviewing the operation of this camera, let us assume that we have just finished exposing one roll of film and are ready to expose another and follow through the steps necessary in the threading and exposing of this second roll of film. The new roll must be threaded into the camera while the turret 14 remains in its "second run" position, see Fig. 2, because if the turret was swung to its "first run" position, the front finder element 16 would prevent the hatch 24 from being opened. As pointed out before, in order to prevent the turret 14 from being swung from the "second run" position before the camera is rethreaded, just as soon as the end of the first roll of film is wound through the gate and back onto the supply roll, the end 98 of lever arm 99 drops into the groove 97 in the latch pin 90 to positively lock the knob 18 from being pulled out of the socket 94 so that the turret 14 can be moved. Furthermore, when the previous film has been exposed, the claw 125 is lifted out of the film path of the gate so that a new film can be fed therethrough and the arm 210 of the multiple arm lever 200 has moved the end 196 of lever 194 out of the path of radial cam 198 on the motor sleeve 151 so that the counter is not operated by further movement of the drive mechanism. This prevents the several interlocks between the drive mechanism and the counter mechanism from getting out of synchronization.

Now in order to thread a new film into the camera, the first step is to open the hatch 24 to the position shown in Fig. 3 and to slip the new roll 28 of film onto the supply spindle 27. The forward end of the film leader is then pushed through the film guideway and gate by merely rotating the supply roll of film in a clockwise direction with the finger, as indicated in Fig. 3. The supply roll is turned until the leading edge of the film leader passes onto the periphery of the take-up core 33 and comes to a stop when it engages the end of the film clutch arm 43 which is fastened to the core periphery. Now should the film be pulled in the opposite direction, the teeth 46 on the clutch arm 43 will drop into the first set of film perforations encountered and the film will be positively fastened to the take-up core. Now if the hatch 24 is closed, the supply spindle 27 and the take-up core 33 will be automatically moved into driving relation with their respective driving clutches and the film loops before and behind the film gate will be properly formed. At the same time the end 68 of the film guide 69 will have engaged the bowed spring 67 to put the necessary pressure on the film at the gate. The edge of the film F, as it is threaded through the film guideway, engages the pin 102 and moves it out of the guideway. This causes the latch lever 99 to be moved to its solid line position shown in Fig. 14 and in which position it releases the knob 18 so that the knob can be pulled outwardly to remove the latch pin 90 from the socket 94 and thus permit the turret 14 to be swung to its "first run" position.

Now the turret is swung to its "first run" position by knob 18 and the camera is ready for the exposure of one-half of the width of the film. Swinging of the turret has caused the objective 13 to be shifted into alignment with the appropriate exposure aperture 62, has shifted the mask 105 so as to uncover this exposure aperture and cover the other exposure aperture 61, and has caused a shift in the L-shaped lever 252 to move the end 211 of arm 205 of the multiple arm lever 200 off the end 139 of claw retracting arm 136, thereby allowing the film claw to move back into the film gate. As previously explained, the mask 105, upon being shifted, will lift and hold one end of the claw 125 out of the film path while allowing the other end to engage and feed the film; the proper end being allowed to enter the film path as commensurate with feeding the film through the gate in a direction from the supply roll 28 to the take-up core 33. In addition, shifting of the L-shaped lever 252 will have shifted the driving clutches 162 and 163 so that the mechanism will be in a condition to drive the take-up core and leave the supply spindle 27 free. Now if the camera is inverted to get the finder element at the top, and the corresponding rear finder element 17 is raised, then the camera is ready for operation by merely depressing the release lever 19.

When the 25 feet of film has been exposed, and before the end of the film has been pulled off of the supply spool 28 (a couple of extra feet of film or leader being provided for this purpose), the drive mechanism will be automatically stopped regardless of whether the release lever 19 is held down, thus informing the operator that it is time to swing the turret to its "second run" position. This is effected when the notched end 206 of arm 207 of multiple arm lever 200 moves into engagement with the stop pin 174 extending through the governor shaft.

Now to continue the exposure, the operator must swing the turret 14 to its "second run" position and this operation automatically shifts the drive from the take-up core 33 to the supply spindle 27, shifts the mask 105 to cover the first used exposure aperture 62 and uncover the other exposure aperture 61 and at the same time lift the first used end of the film claw 125 from the film path and allow the other end to drop into the film path, moves the objective 13 into alignment with the other exposure aperture 61, and moves the notched end 206 of arm 207 out of the path of pin 174 on the governor shaft to release the drive. Now the turret 14 has been swung to its "second run" position, the finder element 16 has been shifted to the other end of the camera, which means that the operator must invert the camera and pull up the corresponding rear finder element for exposing the second half width of the film, this being done by depressing the same release lever 19 which assumes the same position relative to the camera and operator for both "runs."

Just as soon as the exposure of the film is complete and the counter dial reads 50 feet, the claw will be automatically lifted from the film gate and the counter lever 194 will be moved out of operative engagement with the radial cam 198 on sleeve 151 so that the counter will no longer function, even though the motor drive continues to operate. The film leader, which is now the trailer, will be pulled from the take-up core 33 and through the gate by rotation of the supply spindle. As soon as the film leaves that portion of the film guideway including pin 102, lever arm 99 carrying said pin will move under the action of its spring 101 to a position in which its end 98 locks the latch pin 99 against retraction from socket 94 until a new film is threaded through the gate. The hatch 24 is now opened and the spool 28 of exposed film is removed from supply spindle 27, and the camera is ready for the reception of a new roll of film.

While I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim as new and desire to secure by Letters Patent of the United States is:

1. In a motion-picture camera for progressively exposing one-half of a given length of film when moving it through the camera in one direction from a supply roll to a take-up core and for exposing the other half when the feed of the film is reversed and it is moved from the take-up core back onto the supply roll the combination of a casing; a supply spindle adapted to support a supply roll of film and movably mounted in said casing to move between a threading position and a running position; a take-up core movably mounted in said casing to move between a threading position and a running position; a film guideway extending from a point adjacent the periphery of a roll of film on said supply spindle to a point adjacent the take-up core when the two are in their threading positions, and including a film gate comprising a fixed plate defining the focal plane and provided with a pair of exposure apertures in side-by-side relation and a pressure pad adapted to hold the film flat in said focal plane; film attaching means on the take-up core for receiving the end of a film issuing from said guideway and adapted to automatically attach it to said core; means for automatically positioning said take-up core, when said core is moved to its threading position, so that said film attaching means is adapted to receive the end of the film issuing from said guideway; means operated by movement of said supply spindle to its running position for moving said take-up core to its running position and applying spring pressure to the pressure pad of said gate; a slidable mask for selectively covering one or the other of said exposure apertures; an objective movably mounted on said casing to move between two positions in each of which it is in optical alignment with opposite ones of said exposure apertures; shiftable means for feeding a film strip through said gate in opposite directions relative to said exposure apertures; means for automatically stopping said film feeding means when a length of film, short of that carried by the supply roll, has been fed onto the take-up core; and means operable upon shifting the objective from one of its positions to the other for releasing the film feeding mechanism and reversing the direction of said film feed and for shifting said mask from one of its positions to the other.

2. A motion-picture camera according to claim 1 and including means for locking said objective against movement on said casing; and means for releasing said locking means when a film strip is threaded through said film guideway.

3. A motion-picture camera according to claim 1 and including a view finder member movable between two positions on the camera in accordance with the half of the film being exposed; and means for moving said view finder member from one of its positions to the other upon shifting said objective from one of its positions to the other.

4. A motion-picture camera according to claim 1, in which said shiftable means for feeding the film strip through the gate includes a double-ended pull-down claw adapted to intermittently feed the film through the gate, and means for automatically lifting said claw out of the path of the film at the gate when the film is rewound on the supply roll whereby it will not obstruct the feeding of a new film end through said guideway.

5. In a motion-picture camera for exposing one longitudinal half of a given length of film when moving it through the camera in one direction and the other half of the film when moving it in the opposite direction the combination of a casing, a supply spindle movable in said casing between a threading position and a running position and adapted to support a supply roll of film; a take-up core movable in said casing between a threading position and a running position; a film guideway extending from adjacent the convolution of a roll of film on said supply spindle to a point adjacent the take-up core when the two are in their threading positions and including a film gate, film attaching means on the take-up core for receiving the end of a film issuing from said guideway and adapted to automatically attach it to said core, means for automatically positioning said film attaching means on said core to receive the film end issuing from said guideway when said core is moved to its threading position, means operated by movement of said supply spindle to its running position for moving said take-up core to its running position, a pair of exposure apertures in side-by-side relation in said gate, a slidable mask for selectively covering opposite ones of said exposure apertures; an objective movably mounted on said casing to move between a first position in which it is optically aligned with one of said exposure apertures and a second position wherein it is aligned with the other exposure aperture; means for intermittently feeding the film through said gate in either direction; means for selectively driving said supply spindle or said take-up core depending upon the direction the film is to be fed through said gate; means for driving said supply spindle and said take-up core in opposite directions and for driving said intermittent film feeding means; means for alternately selectively connecting said spindle and core to said driving means therefor, a counter-mechanism for indicating the footage of film fed through said gate and adapted to automatically stop said driving means when a given length of film has been fed from the supply spindle to the take-up core which is short of the amount carried by the roll on said spindle; and means operated by shifting the objective to its second position for alternating the driving connection between the spindle and core and said driving means therefor, for reversing the feed of the intermittent film feeding mechanism, and for masking off the exposure aperture previously exposed and unmasking the other exposure aperture, whereby the film can be fed through the film gate in the other direction to expose the other half of the film strip.

6. In a motion-picture camera the combination of a casing; a supply spindle adapted to receive a supply roll of film and movable in said casing between a threading position and a running position; a take-up core movable in said casing between a running position and a threading position and normally moved to its threading position; a film guideway within said casing and extending from a point adjacent the periphery of a supply roll of film on said supply spindle to a point adjacent the take-up core and including a film gate; means on said take-up core for engaging the end of a film as it issues from said guideway and for attaching it to said core; means for moving said take-up core to its running position when said supply spindle is moved to its running position; and means for forming free loops in advance of and beyond the film guideway when said spindle and take-up core are moved to their running positions.

7. In a motion-picture camera according to claim 6 in which said film gate includes a fixed plate defining the focal plane and a pressure pad movable to and from said fixed plate, and means for moving said pressure pad toward said fixed plate and placing it under a spring load when said supply spindle is moved to its running position and removing said spring load when said spindle is moved to its threading position whereby a film strip can be readily pushed endwise through said gate.

8. In a motion-picture camera according to claim 6, means operated by movement of said take-up core to its threading position for rotating said take-up core to a position in which said film attaching means thereon is in a position to receive the end of the film as it issues from said guideway.

9. In a motion-picture camera according to claim 6, means for rotating said take-up core to a position in which said film attaching means thereon is in a position to receive the end of the film as it issues from said guideway, and including a lug on the end of the take-up core; and a cam fixed to said casing to be engaged by the lug on said take-up core as it is moved to its threading position said cam adapted to be engaged by said lug to orient said take-up core on its own axis to a given position relative to the guideway as the core is moved to its threading position.

10. In a motion-picture camera according to claim 6, shiftable means for driving the film strip through the film gate in opposite directions including means for driving either the take-up core or the supply spindle; means for shifting said shiftable means; a latch for locking said shifting means against movement when there is no film in the guideway; and means for automatically releasing said latch when film is threaded through said guideway and attached to the take-up core.

11. In a motion-picture camera according to claim 6, means for driving the film strip through the film guideway in either direction and including a prime mover, a pair of driving clutch members, one for the supply spindle and one for the take-up core; driving means between said prime mover and said clutches for driving them in opposite directions; a driven clutch member on each of the supply spindle and take-up core adapted to be moved into approximate driving relation with opposite ones of the driving clutches when the supply spindle and take-up core are moved to their running positions; means for mounting said driving clutches whereby they can move into and out of driving engagement with said driven clutch members; and means for selectively moving one or the other of the driving clutch members into driving engagement with its corresponding driven clutch member and at the same time moving the other driving clutch member in the opposite sense relative to its corresponding driven clutch member.

12. In a motion-picture camera the combination of a casing; a supply spindle adapted to receive a supply roll of film movable in said casing between a threading position and a running position; a take-up core movable in said casing between a running position and a threading position and normally moved to its threading position; a film guideway within said casing and extending from a point adjacent the periphery of a supply roll of film on said supply spindle to a point adjacent the take-up core when both are in their threading position and including a film gate; a film clutch on the periphery of said take-up core for receiving the end of a film issuing from said guideway and attaching it to the take-up core, said clutch including an arcuate spring member fixed at one end to the periphery of said core, the remainder of said arcuate member embracing the periphery of said core and terminating in a lip portion which is free to move radially away from said core periphery and is turned away from said core periphery to provide a throat portion into which the end of a film issuing from said guideway is adapted to enter and pass between the arcuate spring member and core periphery to be gripped therebetween; and means operated by movement of said take-up core to its threading position for orienting said core on its axis to a position in which said throat portion of the film clutch is in a position to receive the end of the film as it issues from said guideway.

13. In a motion-picture camera the combination of a casing; a supply spindle adapted to receive a supply roll of perforated film movable in said casing between a threading position and a running position; a take-up core movable in said casing between a running position and a threading position and normally moved to its threading position; a film guideway within said casing and extending from a point adjacent the periphery of a supply roll of film on said supply spindle to a point adjacent the take-up core when both are in their threading position, and including a film gate; a film clutch on the periphery of said take-up core for receiving the end of a film issuing from said guideway and positively attaching it to said take-up core, said clutch including an arcuate spring member embracing a portion of the periphery of said take-up core, one end of said member fixed to said core and the other end being free and terminating in a lip turned away from the periphery of said core to provide a throat into which the end of a film issuing from said guideway may enter; a lug on said spring member between its two ends and extending into a recess in the periphery of said take-up core in a position to engage one of the rows of perforations on said film, said lug so formed that it can be cammed out of said recess by a film moving onto said core but will snap into and positively engage one of the film perforations when the film is pulled away from said core, said lug and free end of the spring member so formed and related to one another and the exit end of the film guideway that when the take-up core is in its running position and the film is pulled away from said take-up core the film will engage said lip on the free end of said spring member and deflect said member away from said core sufficiently to remove the lug from the recess in said core and thus free the end of the film from said lug and the core.

14. In a motion-picture camera according to claim 13, a catch on the free end of said arcuate spring member adapted to engage a part of said core and limit the outward movement of the free end of said spring member under the action of a pull on the film to prevent said member from being permanently deflected from said core.

15. In a motion-picture camera the combination of a closed casing; a hinged door in the top wall of said casing movable to and from an open position for threading the camera; a bracket extending from the inside of said door; a supply spindle adapted to receive a supply roll of film carried by said bracket and adapted to move between a threading position outside of said casing when the door is opened and a running position inside of said casing when the door is closed; a take-up core movably mounted within said casing adjacent the bottom wall to move between a threading position and a running position and normally moved to its threading position; a film guideway extending along the front wall of said casing from a point adjacent the periphery of the supply roll of film to a point adjacent the take-up core when the supply spindle and take-up core are in their threading position and through which a film from the supply roll is adapted to be pushed endwise from the supply roll for threading the camera and including a film gate; means on the periphery of said take-up core for receiving the end of a film issuing from said guideway and for automatically attaching it to said core; means for insuring a film end leaving said supply roll passing into said guideway when the supply roll is unwound and including a guide member slidable on one wall of said guideway at the entrance thereof to move between an extended position wherein it substantially contacts the outer convolution of film on a full supply roll and a retracted position wherein it allows the supply spool to move from a threading to a running position; and a spring normally moving said guide member to its extended position so that it can be moved to its retracted position by contact with the supply roll and will automatically move to its extended position when the supply spindle has moved to its threading position.

16. A motion-picture camera according to claim 15 in which said film gate includes a fixed plate defining the focal plane, and a pressure pad for holding the film against said fixed plate but free to move away from said fixed plate when the parts are in threading position; a pivoted arm supporting said take-up core for moving the core between its two positions; and means carried by the bracket on said door adapted to engage said pivoted arm and said pressure pad when the door is closed to move said supply spindle to its running position for automatically moving said take-up core to its running position and for placing said pressure pad under spring tension.

17. In a motion-picture camera the combination of a casing; a supply spindle adapted to receive a supply roll of film, a take-up spindle; a film gate provided with a pair of exposure apertures in side-by-side relation for exposing opposite halves of a film strip as it is moved through the gate in opposite directions; shiftable means for driving the film in opposite directions for the successive exposure of each half thereof; means for automatically stopping and locking said driving means when a given length of film just short of that contained on the supply roll is fed to the take-up spindle; means for shifting said driving means to reverse the direction of drive of the film; and means actuated by said shifting means for releasing said driving means to run the film from the take-up spindle back onto the supply roll.

18. In a motion-picture camera the combination of a casing; a supply spindle adapted to receive a supply roll of film, a take-up spindle; a film gate provided with a pair of exposure apertures in side-by-side relation for exposing opposite halves of a film strip as it is moved through the gate in opposite directions; shiftable means for driving the film in opposite directions for the successive exposure of each half thereof, including a film claw for intermittently feeding the film through said gate; means for automatically stopping and locking said driving means when a given length of film just short of that contained on said supply roll is fed to the take-up spindle, including a lever operated by a counter mechanism actuated by said film driving means; means for shifting said driving means to reverse the direction of drive of the film; means actuated by said shifting means for releasing said driving means to run the film from the take-up spindle back to the supply roll; and means actuated by said lever for automatically withdrawing said film claw from the film path in the gate when said film is rewound on said supply roll whereby the gate is unobstructed to permit a new film to be threaded therethrough.

19. A motion-picture camera according to claim 18 and including means operated by a subsequent shifting of said film driving mechanism for moving said lever to a position where it allows the film claw to re-enter the film gate and engage a film threaded therethrough.

References Cited in the file of this patent

UNITED STATES PATENTS

| | | |
|---|---|---|
| 2,091,508 | Howell | Aug. 31, 1937 |
| 2,172,438 | De Heer | Sept. 12, 1939 |

FOREIGN PATENTS

| | | |
|---|---|---|
| 637,440 | Germany | Oct. 28, 1936 |